A process for preparing a dispersion of encapsulated solid particles in a liquid medium is described, which includes providing a dispersion comprising solid particles, a liquid medium and a polymer comprising at least one repeat unit of the Formula (1) or a salt thereof:

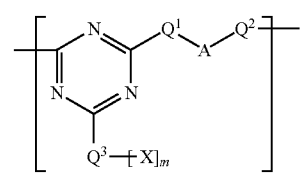

and cross-linking the polymer, wherein X, $Q^1$, $Q^2$, $Q^3$, A and m are as defined.

20 Claims, No Drawings

DISPERSION, PROCESS FOR PREPARING A DISPERSION AND INK JET PRINTING INK

TECHNICAL FIELD

This invention relates to dispersions of encapsulated solid particles, it further relates to processes for preparing said dispersions and to inks (especially ink jet printing inks) containing said dispersions.

BACKGROUND

Inks are often of one of two types, depending on the type of colorant used. Dye-based inks often comprise a dye dissolved in a liquid medium. Pigment inks comprise a pigment dispersed in a particulate form in a liquid medium. Pigment inks tend to have better ozone-fastness and light-fastness than dye-based inks. However, because the pigment is in the form of fine particles there is a tendency for the particles to agglomerate or flocculate whilst the ink is being stored and/or whilst the ink is being used (e.g. printed). Such agglomeration or flocculation before the ink has been printed onto a substrate is highly undesirable, particularly in ink jet printing inks where the printer nozzles are very small and are susceptible to blockage by any oversized particulate matter. Thus, in the ink jet field a great deal of effort has been spent attempting to provide sub micron sized pigment dispersions and increase the colloidal stability of these pigment dispersions.

It is also desirable to provide pigment inks which offer high optical density (OD), especially when printed onto plain paper.

Pigment dispersions are often colloidally stabilised by means of a dispersant.

In our own studies on dispersant stabilised pigment inks we have found that it is particularly difficult to prepare inks which simultaneously exhibit good colloidal stability and high OD on plain paper. For example, we have found that dispersant stabilised pigment inks known in the art having a high colloidal stability provide a low OD when printed on to plain paper and vice versa.

We have also found that the few dispersant stabilised pigment inks which do provide inks exhibiting high OD when printed onto plain paper tend to also use dispersants which require significant and undesirably high amounts of organic solvent to assist in dissolving/dispersing the dispersant, for example in the pigment dispersion or comminution step.

Further it is desirable that a dispersant is effective in the comminution process. Quicker comminution (e.g. milling) to submicron particles sizes saves substantial energy and it may also result in less pigment particles having a particle size markedly smaller than the target size. Particles much below the target size are often referred to as fines.

There is also a need to prepare pigment dispersions which can tolerate liquid vehicles containing significant amounts of organic liquids without flocculating the particulate solid.

Commercially, there still remains a need for dispersants and dispersions which can be used to prepare pigment inks and which solve, at least in part, one or more of the above-mentioned problems.

DETAILED DESCRIPTION

According to a first aspect of the present invention there is provided a process for preparing a dispersion of encapsulated solid particles in a liquid medium comprising:

i) providing a dispersion comprising solid particles, a liquid medium and a polymer comprising at least one repeat unit of the Formula (1) or a salt thereof:

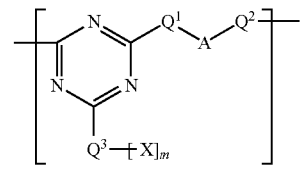

Formula (1)

wherein:
each X independently is an alkyl, aryl, or heterocyclyl group each of which may be optionally substituted;
$Q^1$ and $Q^2$ independently is $NR^1$, O or S; wherein $R^1$ independently is H or an optionally substituted alkyl, aryl or heterocyclyl group;
A is an optionally substituted divalent organic linking group;
m independently is 1 or 2; and
when m is 1, $Q^3$ independently is $NR^1$, O or S and $R^1$ is H or an optionally substituted alkyl, aryl or heterocyclyl group; or when m is 2, $Q^3$ is N; and ii) cross-linking the polymer in the presence of the solid particles and the liquid medium so as to encapsulate the solid particles.

Definitions

In this description the words "a" and "an" mean one or more unless indicated otherwise. Thus, for example, "a" polymer includes the possibility of there being more than one polymer.

Polymer

Preferably, the polymer comprises at least 50 wt %, more preferably at least 70 wt % and especially at least 90 wt % of repeat units of Formula (1) or salts thereof relative to the total polymer composition. More preferably the polymer comprises only the repeat units of Formula (1) or a salt thereof and terminal groups. The remaining polymer chain when required to make things up to 100% may be a polyurethane or polyester chain.

The polymer structure may be branched but is preferably linear.

Depending on the method of preparation and the relative amounts of monomers used to prepare the polymer, the terminal groups may be attached to triazines and/or $Q^2$ groups.

Repeat Units

Preferably, the polymer comprises from 2 to 1000, more preferably from 2 to 500, especially from 2 to 100 and most especially from 2 to 50 repeat units of the Formula (1) or a salt thereof.

In some cases n may be at least 3, more preferably at least 4 and even more preferably at least 5. Thus for example n may be from 3 to 1000, from 4 to 1000 or from 5 to 1000.

The repeat units may all be of the same formula or they may be different. When more than one repeat unit is present in the polymer each A, m, X, $Q^1$, $Q^2$ and $Q^3$ may be independently selected from the possibilities previously defined in the first aspect of the present invention.

Accordingly, a preferred polymer has the formula (1A) or a salt thereof:

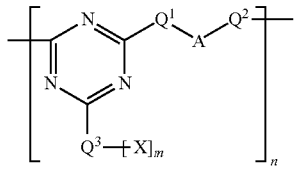

Formula (1A)

wherein:
  each X independently is an alkyl, aryl, or heterocyclyl group each of which may be optionally substituted;
  each $Q^1$ and $Q^2$ independently is $NR^1$, O or S; wherein each $R^1$ independently is H or an optionally substituted alkyl, aryl or heterocyclyl group;
  each A independently is an optionally substituted divalent organic linking group;
  n is from 2 to 1,000
  each m independently is 1 or 2; and
  in each case when m is 1, $Q^3$ independently is $NR^1$, O or S and each $R^1$ independently is H or an optionally substituted alkyl, aryl or heterocyclyl group; and when m is 2, $Q^3$ is N.

n n is preferably from 2 to 1000, more preferably from 2 to 500, especially from 2 to 100 and most especially from 2 to 50. The value of n may be measured by any suitable technique. Preferred techniques include gel permeation chromatography, viscometry, vapour pressure osmometry, mass spectrometry and multiple angle laser light scattering.

A preferred technique is gel permeation chromatography. This is preferably performed using a water, THF or DMF solvent. The molecular weight is preferably established relative to polystyrene and more especially relative to poly(ethyleneglycol) standards. To establish the value of n it is preferred to divide the number averaged molecular weight by the mass of the repeat unit expressed by formula (1) based on the specific monomers employed.

Chromophores

Preferably, the polymer used in the present invention comprises no chromophore groups. Preferably, the polymers comprise no chromophores having an absorption peak in the 350 to 750 nm wavelength range. In particular it is preferred that the polymer does not comprise any dye groups which are covalently bonded into the polymer structure. Examples of groups preferably absent include azo, xanthene, anthraquinone, friaryl methane, azine, thiazine, acridine, rhodamine, phthalocyanine and nigrosine groups. This allows the polymers in present invention to be used with any particulate solid without potentially disrupting the desired shade.

Terminal Groups

The polymer may be terminated in a number of ways.

The terminal group may be any monovalent group.

Typical terminal groups include H, OH, halogen, $C_{1-30}$ alkyl-NH—, $C_{1-30}$ alkyl-S—, $C_{1-30}$-alkyl-O—, phenyl-NH—, phenyl-S— and phenyl-O—.

Including terminal groups, examples of polymers comprising at least one repeat unit of Formula (1) or salt thereof include those of Formulae (1a), (1b) and (1c):

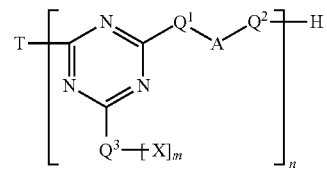

Formula (1a)

wherein T is a terminal group selected from OH, halogen, $C_{1-30}$ alkyl-NH—, $C_{1-30}$ alkyl-S—, $C_{1-30}$-alkyl-O—, phenyl-NH—, phenyl-S— and phenyl-O— groups;

Formula (1b)

wherein $Q^4$ and $Q^5$ are each independently $NR^1$, O or S; wherein each $R^1$ independently is H an optionally substituted alkyl, aryl or heterocyclyl group; and A' is an optionally substituted divalent organic linking grow;

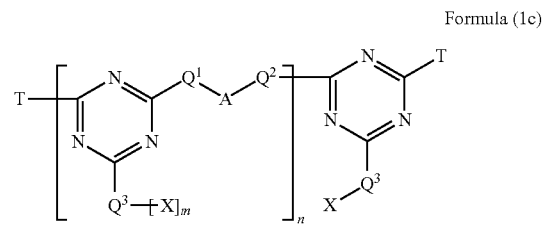

Formula (1c)

wherein each T independently is as described above.

In some cases it may be desirable to post react any halo-triazine groups used to prepare the polymer. Suitable post reaction agents include mono functional amines, thiols and alcohols. Of these mono-functional organic amines are preferred.

In one preferred case mono thiols, mono alcohols and especially mono amines may be used as endcapping agents to provide the polymer of Formula (1c) wherein T=alkyl/aryl/cycloalkyl linked via an $NR^1$, S or O group to the triazine ring, wherein $R^1$ is as defined previously. Preferably T is $C_{1-20}$ alkyl/cycloalkyl-NH—.

In another case a molar excess of the compound $HQ^1AQ^2H$ may be used to prepare the polymer, in which case the polymer is of the Formula (1b).

In one case, any remaining halo-triazine groups are allowed to hydrolyse with water to give OH groups. Accordingly, in one case all the T groups present are OH.

Water-Dispersing Groups

Preferably, prior to cross-linking the polymer has at least one water-dispersing group in its structure. Preferably, at least one of the repeat units has at least one water-dispersing group in its structure.

Water-dispersing groups as defined herein mean those hydrophilic groups which aid in the dispersal or dissolution of the polymer in water. Preferred examples of water-dispersing groups include polyethyleneoxide ending in OH or $C_{1-6}$ alkyl, —$SO_2NH_2$, —OH, —$SO_3H$, —$CO_2H$ groups and phosphorus containing acids.

The acidic water dispersing groups —$SO_3H$, —$CO_2H$, and especially phosphorus containing acids are preferred. Preferably, at least one of the water-dispersing group(s) present is a phosphorus containing acid group. More preferably all of the water dispersing groups present in the polymer are phosphorus containing acid groups.

Preferred phosphorus containing acids include phosphoric acids including mono esters and polyphosphoric acids and phosphonic acids including mono esters and polyphosphonic acids. Of these —$OPO_3H_2$ (phosphoric acid) and most especially —$PO_3H_2$ (phosphonic acid) including salts thereof are preferred. We have found that phosphonic acid groups in particular tend to make the polymer more effective as a pigment dispersant and result in final inks which when printed have improved optical density (OD). Mono phosphonic acid groups and bis phosphonic acid groups are especially suitable.

Preferably, the polymer has from 0.1 to 10, more preferably from 0.1 to 5, even more preferably from 0.2 to 2 and especially from 0.3 to 1 water-dispersing groups for every triazine ring which is present in the polymer structure.

Preferred sites for the attachment of water-dispersing group(s) include A, $R^1$, X, more preferably A and X, and especially X. Preferably, at least one water-dispersing group present is attached to at least one of the X groups. In some cases all of the water-dispersing groups which are present in the repeat unit(s) are attached to X groups.

$Q^1$, $Q^2$, $Q^4$ and $Q^5$

At least one, more preferably all of the groups $Q^1$ and $Q^2$ present in the polymer are of the Formula $NR^1$. The same preference is true for the groups $Q^4$ and $Q^5$ when present. This linkage is preferably formed via an amine/halo-triazine coupling reaction which tends to be particularly effective.

When $R^1$ is optionally substituted alkyl, it is preferably optionally substituted $C_{1-20}$ alkyl.

When $R^1$ is an optionally substituted aryl group it is preferably an optionally substituted phenyl or naphthyl group.

When $R^1$ is optionally substituted heterocyclyl it may be aromatic (heteroaryl) or non aromatic. When $R^1$ is heterocyclyl it is preferably a 5- or 6-membered ring containing from 1 to 3 atoms selected from N, S and O in the ring.

Preferred examples of which include optionally substituted pyrrolyl, thiophenyl, furanyl, pyridyl, pyrimidyl, pyrazinyl, triazinyl, imidazolyl, thiazolyl, oxazolyl and pyrazolyl.

Optional Substituents

When $R^1$ is not H, the optional substituents for $R^1$ include —$NO_2$, CN, halo (especially Cl, F, Br and I), —$NHC(O)C_{1-6}$alkyl, —$SO_2NHC_{1-6}$alkyl, —$SO_2C_{1-6}$alkyl, —$C_{1-6}$alkyl optionally carrying an OH group, —$OC_{1-6}$alkyl optionally carrying an OH group, —$NHCONH_2$, —$OC(O)C_{1-6}$alkyl, polypropyleneoxide ending in OH or a $C_{1-6}$alkyl group, polyethyleneoxide ending in OH or a $C_{1-6}$ alkyl group, —OH, —$SO_3H$, —$PO_3H_2$, —$OPO_3H_2$, —$SO_2NH_2$ and —$CO_2H$.

The optional substituents for $R^1$ may also be used as optional substituents for any other group which mentions the possibility of being optionally substituted.

Most preferably $R^1$ is H.

$Q^3$

Preferably, at least one, more preferably all of the $Q^3$ groups are NH (m=1) or N (m=2). To put this another way the group $Q^3X_m$ is preferably —$NR^1X$ or —$NX_2$. $R^1$ when present in $Q^3$ may be any of the abovementioned groups but is preferably H.

X

Generally speaking X may be any of the groups stated for $R^1$ including all of the substituents which may be present on $R^1$.

Preferably, at least one, more preferably most or all of the X groups in the polymer have attached water-dispersing group(s), wherein the water-dispersing groups are as hereinbefore mentioned. Unless mentioned to the contrary the word attached as used herein means covalently bonded.

Preferably, when an X group present in the polymer has a water-dispersing group it has from 1 to 3, more preferably 1 or 2 water-dispersing groups.

Preferably, these water-dispersing groups are phosphorus containing acid groups, more preferably —$OPO_3H_2$ or —$PO_3H_2$, most preferably —$PO_3H_2$ groups. We have found that phosphonic acid groups in this location in the polymer structure result in particularly good dispersant properties and inks which when printed offer high optical density (OD).

Preferred examples of X include phenyl, naphthyl, —$C_{1-20}$alkyl and 5- or 6-membered heteroaromatic groups containing from 1 to 3 N, S or O atoms in the ring; each of which being preferably substituted with from 1 to 3 —$PO_3H_2$ groups and optionally one or more substituents other than —$PO_3H_2$ groups.

When an X group is a $C_{1-20}$ alkyl it is preferred that X is of the formula $C_{1-6}$alkyl-$PO_3H_2$. Suitable examples of X groups of this kind include *$CH_2PO_3H_2$, *$CH_2CH_2PO_3H_2$, *$CH_2CH_2CH_2PO_3H_2$, $CH_3CH$*$CH_2PO_3H_2$, *$CH_2CH_2CH_2CH_2PO_3H_2$ wherein the asterisk (*) represents the point of attachment to the $Q^3$ group.

When an X group is a phenyl it is preferably of the Formulae (4a, 4b or 4c):

Formulae

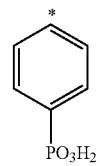

(4a)

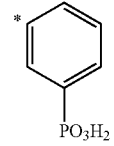

(4b)

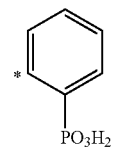

(4c)

wherein the asterisk (*) represents the point of attachment to the $Q^3$ group.

The group X may comprise both aromatic and aliphatic groups. For example an X group may be of the Formula (5a):

Formula (5a)

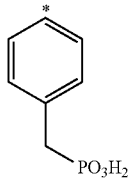

wherein the asterisk (*) represents the point of attachment to the $Q^3$ group.

The group X may also have two phosphonic acid groups. Suitable examples of which include those of Formulae (6a, 6b and 6c):

Formulae

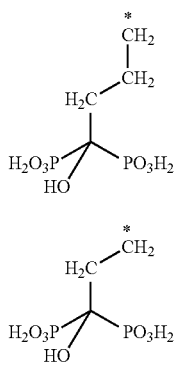

6a

6b

6c wherein the asterisk (*) represents the point of attachment to the $Q^3$ group.

The group X may also be of the Formulae (7a or 7b):

Formulae

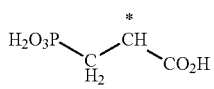

7a

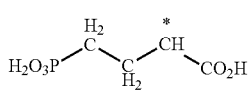

7b wherein the asterisk (*) represents the point of attachment to the $Q^3$ group.

Most preferably at least some of the X groups are of the formula $*CH_2PO_3H_2$ where in the asterisk (*) represents the point of attachment to the $Q^3$ group.

In one case $Q^3$ is N, m=2, one of the X groups is $*CH_2CO_2H$ and the other X group is $*CH_2PO_3H_2$ wherein the asterisks represent the point of attachment to the N atom ($Q^3$). This is the glyphosate residue.

At least some of the X groups may be of the formula $*CH_2CH_2SO_3H$ or $*CH_2CO_2H$ wherein the asterisks represent the point of attachment to $Q^3$ group. X may be a polyethyleneoxy chain ending in $C_{1-6}$ alkyl or OH.

$Q^3X$

Preferably at least some of the groups $Q^3(X)_m$ present in the polymer are of the formula $—NHCH_2PO_3H_2$ or $—N(CH_2PO_3H_2)_2$.

A and A'

The groups A and when present A' in the polymer may be any divalent organic linking group.

A and A' may independently be an alkylene, a cycloalkylene, aromatic, or heterocyclic group. The heterocyclic groups may be aromatic or non-aromatic. The groups A and A' may be combinations of these. The groups A and A' may be interrupted by groups such as $—O—$, $—NH—$, $—S—$, $—CO_2—$, $—NHCO—$, $—SO_2—$ and $NHSO_2—$. A and A' may be polymeric, for example A/A' may be an acrylic, styrenic, styrene-acrylic, polyester, polyurethane or polyether polymer. Preferably A and A' are an arylene, an alkylene or a combination thereof. A and A' may be optionally substituted with one or more of the optional substituents as mentioned for $R^1$. The groups A and A' may have one or more water-dispersing groups as hereinbefore mentioned. In some embodiments A and/or A' is/are unsubstituted.

When A or A' is arylene it is preferably divalent naphthylene or phenylene. When A is phenylene the linking groups to $Q^1$ and $Q^2$ may be arranged in an ortho, meta or para position. The same is possible for A' wherein the linking groups are now $Q^4$ and $Q^5$.

When A or A' is an alkylene group it is preferably a $C_{2-30}$ alkylene, especially a $C_{2-10}$ alkylene and most especially a $C_{2-6}$ alkylene. Preferred examples are $(CH_2)_4$ and $(CH_2)_6$. These may be branched or linear.

In one preferred embodiment A is xylylene $*(CH_2\text{-phenylene-}CH_2)*$, preferably the $CH_2$ groups are in meta or para positions relative to each other. The asterisk (*) represents the point of attachment to the groups $Q^1$ and $Q^2$.

In view of the foregoing, preferably each A present in the polymer is independently selected from $C_{2-30}$ alkylene, a phenylene, a naphthylene and a xylylene group each of which may be optionally substituted.

We have found that when A is $(CH_2)_4$, $(CH_2)_6$ or A is p-xylylene the resulting polymers exhibit good dispersant properties and provide inks which when printed have good optical density. Preferably at least one, more preferably most and especially all of the A groups present in the polymer are selected from $(CH_2)_4$, $(CH_2)_6$ or p-xylylene.

Salts

The polymer as defined in the first aspect of the present invention may be present in the form of the free acid, the salt or a mixture thereof. Preferably, the polymer is at least partially, more preferably at least 50% in the form of the salt.

Preferred salts include those with the alkali metals (especially lithium, sodium and potassium), ammonia, organic amines and alkanolamines. Salts with organic quaternary amines and pyridinium are also possible.

Isomers

Whilst the polymer as defined in the first aspect of the present invention has been drawn in one formula the polymers and the scope of the claims are also intended to cover several isomers thereof including: tautomers, optical isomers, isotopic isomers and geometric isomers.

Cross-Linkable Groups

In one case prior to cross-linking the polymer has at least one cross-linkable group which is an ethylenically unsaturated group and the cross-linking is effected by means of the addition of an initiator. Preferably, a free radical initiator.

In another case prior to cross-linking the polymer has groups selected from —NH$_2$, —SH, —OH, —CO$_2$H, epoxy, phosphorus containing acid (as previously mentioned) and —NCO including salts thereof. We have found that these groups are especially suitable for cross-linking. Of these —CO$_2$H and/or phosphorus containing acid groups or salts thereof are preferred. The most preferred cross-linking group is phosphorus containing acid groups. In some cases it is possible and sometimes preferable to use only phosphorus containing acid groups as cross-linkable groups.

In any case the polymer is preferably cross-linked by the addition of a cross-linking agent. Thus such encapsulated particulate solids are, for example, cross-linked via phosphorus containing acid and/or a carboxylic acid groups.

The cross-linkable groups may be attached to the X, R$^1$, T and/or the A groups, more preferably the X and/or A groups and especially the X groups.

Water-Dispersing and Cross-Linkable Groups

It is preferred that the groups present in the polymer confer both water-dispersibility and cross-linkability. Some groups (e.g. phosphorus containing acids and carboxylic acids) can simultaneously provide water-dispersible and cross-linkable groups. Such groups provide a dual functionality and are especially preferred. In some cases a mixture of different kinds of groups are required to provide water-dispersible groups and cross-linkable groups (an example would be epoxy cross-linkable groups and monoalkyl terminated polyethyleneoxide water-dispersing groups). In some cases it is possible to use two or more groups each of which are both water-dispersing and cross-linkable. An example is a polymer containing both carboxylic acid and phosphorus containing acid groups.

Groups such as phosphorus containing acids and carboxylic acids are preferably attached to A and/or X groups, more preferably to X groups (although not necessarily to the same X group).

In one case the polymer comprises mixtures of repeat units of formula (1) or a salt thereof. It is possible that, at least one of the repeat units has at least one water-dispersing group (especially a phosphorus containing acid) and at least one of the repeat units has at least one cross-linkable group (preferably a carboxylic acid). It is possible that, the water-dispersing group(s) is/are attached to an X group in a first repeat unit and the cross-linkable group(s) is/are attached to an X group in a second repeat unit.

In another case it is possible to have a single repeat unit containing both water dispersing group(s) and cross-linkable group(s), for example a single X group may have both water-dispersing group(s) and cross-linkable group(s) attached thereto, equally as a second example it is possible to have two X groups in a single repeat unit (when m=2 and Q$^3$=N) one of which has at least one water-dispersing group and the other of which has at least one cross-linkable group.

In addition it is optionally possible to have some X groups which have hydrophobic groups such as alkyl or aryl groups to help tailor the overall hydrophobicity of the polymer and to improve dispersant properties.

Polymers

Some of the polymers used in the present invention (prior to cross-linking) constitute a further aspect of the present invention.

According to a second aspect of the present invention there is provided a polymer as defined in part i) of the first aspect of the present invention which has:
i) one or more phosphonic acid groups or salts thereof within its structure; and
ii) one or more groups selected from —NH$_2$, —SH, —OH, —CO$_2$H, epoxy and —NCO groups including salts thereof in its structure.

Preferably the polymer according to the second aspect of the present invention prior to cross-linking comprises at least two kinds of repeat units of Formula (1) or a salt thereof:
i) a first repeat unit which has one or more phosphonic acid groups or salts thereof within its structure; and
ii) a second repeat unit which has one or more groups selected from —NH$_2$, SH, —OH, —CO$_2$H, epoxy and —NCO groups including salts thereof in its structure.

Preferably, the phosphonic acid in i) is attached to an X group in the first repeat unit.

Preferably, the groups in ii) is/are CO$_2$H groups. Preferably, the group in ii) is attached to an X group in the second repeat unit.

Preferably, the ratio of repeat units i) and ii) is from 1:10 to 10:1, more preferably 5:1 to 1:5 and especially from 2:1 to 1:2.

Preferably, the polymer has from 0.1 to 8 mmoles, more preferably from 0.3 to 4 mmoles, especially from 1 to 2.7 mmoles and most especially from 1 to 2.5 mmoles of acid groups per g of dispersant.

Preferably, the polymer has no sulfonic acid groups.

Preferably, the dispersant has less than 0.1 mole of polyethylene oxide groups per mole of triazine rings present in the polymer, more preferably the dispersant has no polyethylene oxide groups.

Preferably, the polymer contains no water-dispersible or cross-linkable groups other than carboxylic acid and phosphonic acids.

A preferred polymer according to the second aspect of the present invention comprises a chain of the Formula (2) or a salt thereof:

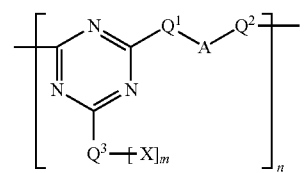

Formula (2)

wherein:
each X independently is an alkyl, aryl, or heterocyclyl group each of which may be optionally substituted;
each Q$^1$ and Q$^2$ independently is NR$^1$, O or S; wherein each R$^1$ independently is H or an optionally substituted alkyl, aryl or heterocyclyl group;
each A independently is an optionally substituted divalent organic linking group;
n is from 2 to 1,000
each m independently is 1 or 2; and
in each case when m is 1, Q$^3$ independently is NR$^1$, O or S and each R$^1$ independently is H or an optionally substituted alkyl, aryl or heterocyclyl group; and when m is 2, Q$^3$ is N;

said polymer having one or more phosphonic acid groups or salts thereof and one or more groups selected from —NH₂, —SH, —OH, —CO₂H, epoxy and —NCO (especially —CO₂H) groups or salts thereof.

The preferences for all these groups are as hereinbefore mentioned.

This polymer chain may be terminated as previously mentioned.

Preferably, the polymers according to the second aspect of the present invention have no chromophore or dye groups are previously mentioned.

Returning to the first aspect of the present invention, specific examples of preferred repeat units include those having the Formulae (8a)-(8l):

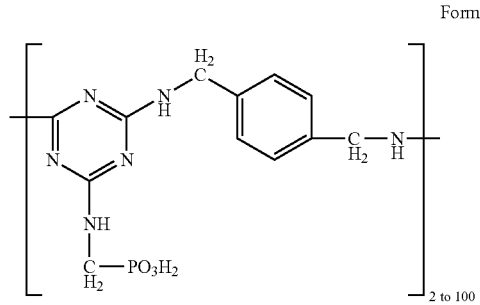

Formula (8a)

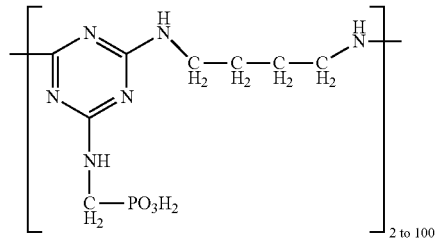

Formula (8b)

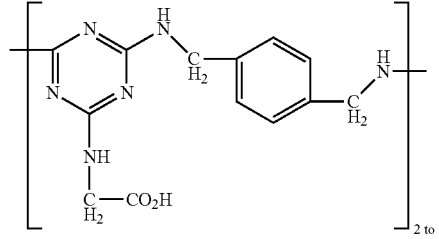

Formula (8c)

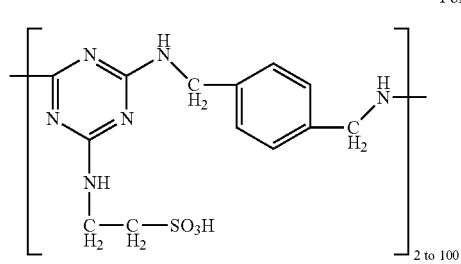

Formula (8d)

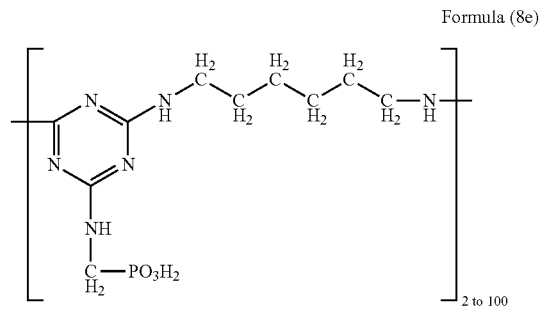

Formula (8e)

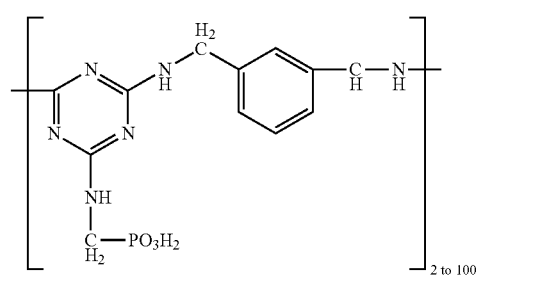

Formula (8f)

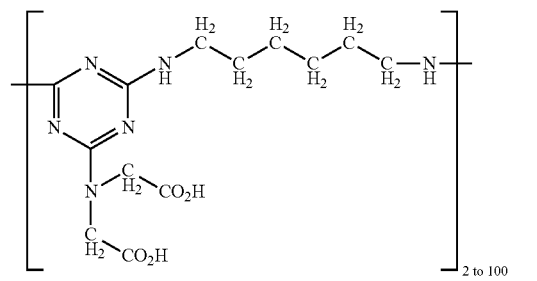

Formula (8g)

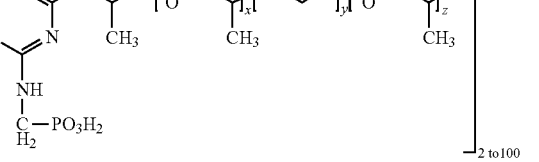

Formula (8h)

wherein y is about 9 and x + z is about 3.6

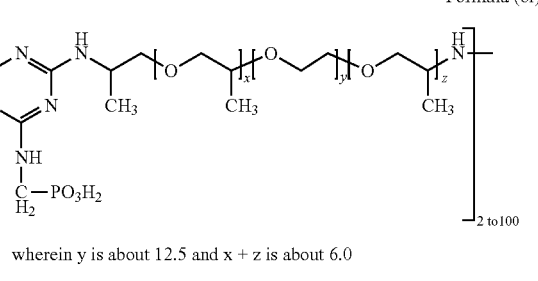

Formula (8i)

wherein y is about 12.5 and x + z is about 6.0

-continued

Formula (8j)

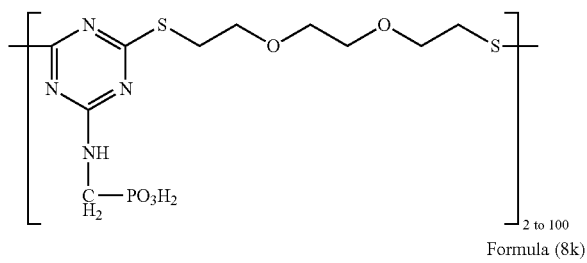

Formula (8k)

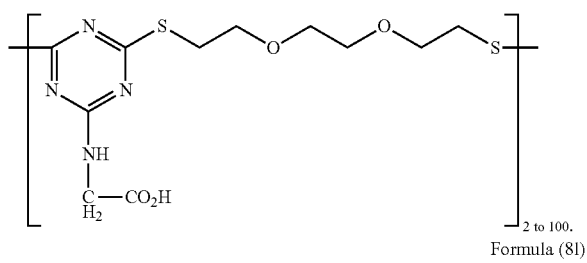

Formula (8l)

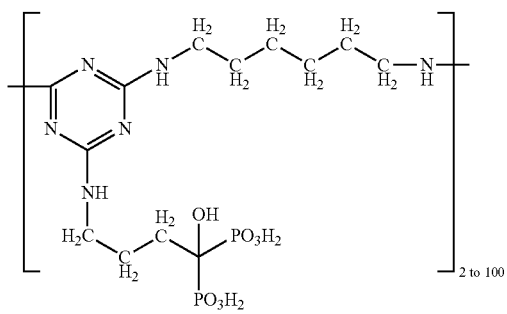

Polymers comprising repeat units containing carboxylic acid groups may also comprise repeat units containing phosphorus acids (especially phosphonic acid). Thus, as an example polymer comprising a repeat unit of Formula (8a) and (8c) is suitable for the present invention. Other combinations of this kind will be readily apparent to those skilled in the art.

Synthesis

The polymers as defined in the first aspect and according to the second aspect of the present invention may be prepared by reacting in any order:
i) a compound of Formula (3);

Formula (3)

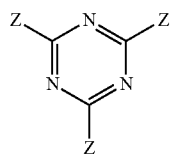

wherein Z is a halogen atom;
ii) a compound of the formula $HQ^3X_m$; and
iii) a compound of the formula $HQ^1AQ^2H$ wherein A, X, $Q^1$, $Q^2$, $Q^3$ and m are as previously defined.

Compounds of Formula (3)

The halogen atom for Z may be I, Br or F but is preferably Cl, accordingly the compound of Formula (3) is preferably cyanuric chloride.

In addition to the compound of Formula (3) the polymer chain may be prepared by additionally reacting relatively minor amounts of dihalopyrimidine compounds and/or 1,3-dinitro-4,6-difluorobenzene.

Compounds of Formula $HQ^3X_m$

The polymers may be prepared by reacting just one kind of compound of the formula $HQ^3X_m$ or (more preferably) more than one compound of this formula.

Preferably, at least some of the compounds of formula $HQ^3X_m$ have at least one, more preferably 1 or 2 water-dispersing groups.

When the water-dispersing groups are carboxylic and/or sulfonic acid groups preferred compounds of formula $HQ^3X_m$ include taurine, sulfanilic acid, glycine and beta alanine.

At least some of the compounds of formula $HQ^3X_m$ preferably have at least one (more preferably 1 or 2) phosphorus containing acid (especially phosphoric acid and phosphonic acid) groups.

Preferred examples of phosphonic acid containing compounds include aminomethylphosphonic acid, iminodi(methylphosphonic acid) N-methylaminomethylphosphonic acid, 2-aminoethylphosphonic acid, 3-aminopropylphosphonic acid, meta, ortho and para-aminophenylphosphonic acid, 4-aminobenzyl phosphonic acid, alendronic acid, pamidronic acid, neridronic acid, glyphosate, 2-amino-3-phosphono propionic acid, 2-amino-4-phosophono butyric acid and the like. Of these aminomethylphosphonic acid and alendronic acid are preferred.

In some cases some of the compounds of formula $HQ^3X_m$ have no water-dispersing groups. Examples include $C_{1-6}$ alkyl amines and optionally substituted aryl amines.

It is possible to use a combination of compounds of formula $HQ^3X_m$, for example some of which contain at least one cross-linkable group and some of which contain at least one water-dispersing groups. In addition optionally some of the compounds of the formula $HQ^3X_m$ may have no water-dispersing groups (hydrophobic groups), in this manner the hydrophilicity of the polymer can be tailored to provide best dispersant characteristics.

It is preferable that at least some of the compounds of formula $HQ^3X_m$ comprise one or more cross-linkable groups selected from —$NH_2$, —SH, —OH, —$CO_2H$, epoxy, a phosphorus containing acid and —NCO groups including salts thereof in its structure. Preferably, these are attached to the X group. Preferably, the cross-linkable group is —$CO_2H$ and/or a phosphorus containing acid or a salt thereof. In some cases the cross-linkable group is only phosphorus containing acid groups or salts thereof.

In some cases the polymer is prepared from at least two kinds of compound of the formula $HQ^3X_m$:
i) a first compound having one or more phosphorus containing acid (especially phosphonic or phosphoric acid) groups or salts thereof;
ii) a second compound having one or more groups selected from —$NH_2$, —SH, —OH, —$CO_2H$, epoxy and —NCO (especially —$CO_2H$) groups or salts thereof.

Compounds of the Formula $HQ^1AQ^2H$

The polymer may contain just one kind of A group or a mixture of different A groups. Equally the polymer may be prepared from a single compound of the formula $HQ^1AQ^2H$ or a mixture of compounds of that formula.

The compound of the formula $HQ^1AQ^2H$ is preferably a diamine of the formula $H_2N$-$ANH_2$.

The A group may have no water-dispersing groups in which case suitable examples of $HQ^1AQ^2H$ include ethylenediamine, 1,3-diaminopropane, 1,4-diaminobutane, 1,5-diaminopentane, 1,6-diaminohexane, 1,7-diaminoheptane, 1,8-diaminooctane, 1,9-diaminononane, 1,10-diaminodecane, 1,11-diaminoundecane, 1,12-diaminododecane, p-xylylenediamine, m-xylylenediamine, p-phenylenediamine, m-phenylenediamine, 4,4'-Diaminodiphenyl sulfone, piperazine, 1-(2-aminoethyl)piperazine, 2-methylpentamethylenediamine (DYTEK A), 1,3-pentanediamine (DYTEK EP), bis(hexamethylene)triamine (DYTEK BHMT-HP), trimethylhexamethylenediamine, 1,2-diaminocyclohexane, 1,3-diaminocyclohexane, 1,4-diaminocyclohexane. Preferred examples of which include 1,4-diaminobutane, 1,6-diaminohexane and p-xylylene diamine.

Dihydrazides (e.g. adipic acid dihydrazide) and urea may also be used.

The compounds of Formula $HQ^1AQ^2H$ may have water-dispersing groups in which case suitable examples of $HQ^1AQ^2H$ include lysine, p-phenylenediaminesulphonic acid, m-phenylenediaminesulphonic acid, p-phenylenediaminedisulphonic acid, m-phenylenediameinedisulphonic acid and 4,4'-diaminodiphenylamine-2-sulphonic acid. The $HQ^1AQ^2H$ compound may also be a polyetherdiamines such as those marketed as JEFFAMINE® diamines (D, ED, EDR series) by Huntsman.

The compounds of the formula $HQ^1AQ^2H$ may have ethylenically unsaturated groups.

By using combinations of different compounds of the formula $HQ^1AQ^2H$, the hydrophilicity of the polymer can be tailored to provide best dispersant characteristics.

The compound of Formula $HQ^1AQ^2H$ may be a diol. Any diol may be used without limitation and preferred diols are those often used in the preparation of polyesters and polyurethanes. Low molecular weight diols may be used, examples of which include ethylene glycol; propylene glycol; 1,3-propanediol; 1,4-butanediol; 1,5-pentanediol; 1,6-hexanediol; 1,2-hexadecanediol, 1,2-dodecanediol, glycerol monoesters or diesters of fatty acids (such as glycerol monooleate, glycerol monostearate and the like), neopentyl glycol; diethylene glycol; dipropylene glycol; 2,2,4-trimethyl-1,3-pentanediol; 1,4-cyclohexanedimethanol; hydroquinone; resorcinol; 4,4'-sulphonyldiphenol; bisphenol A; ethylene oxide and/or propylene oxide adducts of bisphenol A; and ethylene oxide and/or propylene oxide adduct of hydrogenated bisphenol A, trimethylolpropane, trimethylolethane, and mixtures thereof.

Oligomeric diols may be used. Preferred examples of which include polyester diols, polyether diols, acrylic diols and polycarbonate diols.

The compound of Formula $HQ^1AQ^2H$ may be a dithiol. As examples of dithiols there can be mentioned 1,2-ethanedithiol, 1,2-propanedithiol, 1,3-propanedithiol, 1,10-decanedithiol, dipentene dimercaptan, ethylcyclohexyl dimercaptan, 1,4-benzenedithiol, 1,3-benzenedithiol, 3,6-dioxa-1,8-octanedithiol, 4,4'-thiobisbenzenethiol and 1,2-benzenedithiol.

Synthetic Conditions

The process for preparing the polymer as defined in the first and according to the second aspect of the present invention may be carried out in a number of ways, but three simple schemes are outlined below.

Scheme I

In scheme I the process for preparing the polymer chain comprises the steps:
i) reacting a compound of Formula (3) with a compound of Formula $HQ^3X_m$;
ii) reacting the product of step i) with a compound of Formula $HQ^1AQ^2H$;
iii) heating the product of step ii) so as to cause polymerisation;
iv) optionally end-capping or hydrolysing any remaining halotriazine groups.

Scheme II

In scheme II the process for preparing the polymer chain comprises the steps:
i) reacting a compound of Formula (3) with a compound of Formula $HQ^1AQ^2H$;
ii) reacting the product of step i) with a compound of Formula $HQ^3X_m$;
iii) heating the product of step ii) so as to cause polymerisation;
iv) optionally end-capping or hydrolysing any remaining halotriazine groups.

Scheme III

In scheme III the process for preparing the polymer chain comprises the steps:
i) reacting a compound of Formula (3) with a compound of Formula $HQ^1AQ^2H$;
ii) heating the product of step i) so as to cause polymerisation;
iii) reacting the product of step ii) with a compound of Formula $HQ^3X_m$;
iv) optionally end-capping or hydrolysing any remaining halotriazine groups.

In schemes I, II and III the preferred temperatures for step i), ii) and iii) are 0 to 20° C., 20 to 40° C. and 40 to 100° C. respectively.

In each step the reaction is preferably carried out in a liquid vehicle which is preferably aqueous, more preferably consists only of water. Organic liquid vehicles may also be used, suitable examples of which include N-methylpyrrolidone and sulfolane.

In each step the reaction is preferably maintained at a pH of from 4 to 10.

In scheme I, steps i) and ii) the pH is preferably from 4 to 8. In scheme I, step iii) the pH is preferably from 6 to 10.

The end-capping reaction may be as hereinbefore described.

Hydrolysis is preferably accomplished by choosing an aqueous liquid vehicle for the reaction (more preferably the liquid vehicle is only water) and heating the product of step iii) optionally whilst the liquid vehicle has an acidic or a basic pH. In practice the hydrolysis is preferably performed by using water as the liquid vehicle for step iii), adjusting the pH to 9 to 10 and heating at 60 to 100° C.

Solid

Any suitable solid may be used without particular limitation provided that it is in the form of particles.

The solid may comprise and preferably is an inorganic or organic solid material or mixture thereof which is insoluble in the liquid medium. By insoluble we mean a solid having a solubility of no more than 1%, more preferably no more than 0.1% by weight in the liquid medium. The solubility is preferably measured at a temperature of 25° C. The solubility is preferably measured at a pH of 8. Preferably, the solubility is measured in water, more preferably deionized water.

Examples of suitable solids are extenders and fillers for paints and plastics materials; optical brightening agents; particulate ceramic materials; magnetic particles (e.g. for use in magnetic recording media); metallic particles, polymeric particles, biocides; agrochemicals; pharmaceuticals and colorants.

Preferably, the solid is a colorant. Preferably the colorant is a pigment or a dye, more preferably a pigment. We have found that the polymers used in the present invention work especially well as pigment dispersants.

The pigment may be organic or inorganic.

A preferred pigment is an organic pigment, for example any of the classes of pigments described in the Third Edition of the Colour Index (1971) and subsequent revisions of, and supplements thereto, under the chapter headed "Pigments". Examples of organic pigments are those from the azo (including disazo and condensed azo), thioindigo, indanthrone, isoindanthrone, anthanthrone, anthraquinone, isodibenzanthrone, triphendioxazine, quinacridone and phthalocyanine series, especially copper phthalocyanine and its nuclear halogenated derivatives, and also lakes of acid, basic and mordant dyes. Preferred organic pigments are phthalocyanines, especially copper phthalocyanine pigments, azo pigments, indanthrones, anthanthrones, and quinacridones.

Preferred inorganic pigments include carbon black (especially gas blacks), titanium dioxide, silicon dioxide, aluminium oxide, iron oxides and sulfides.

Suitable pigments are described in PCT patent application WO 2006/064193 at page 2, lines 22 to 40.

Preferably, the solid is not dispersible in an aqueous liquid medium without the aid of a dispersant, i.e. the presence of a dispersant is required to facilitate dispersion. Preferably, the solid is not chemically surface treated, for example by having ionic groups covalently bonded to its surface (especially not —$CO_2H$ or —$SO_3H$).

For ink jet especially suitable pigments are carbon blacks, C.I. Pigment Red 122, C.I. Pigment Blue 15:3 and C.I. Pigment Yellow 74. Of course there are many alternative pigments.

Preferably, the solid particles in the dispersion have an average particle size of less than 1 micron, more preferably from 10 to 500 nm, especially from 30 to 300 nm and most preferably from 50 to 200 nm. The average particle size may be a Z or volume average size. The particle size may be measured by suitable techniques including laser light scattering.

Liquid Medium

The liquid medium used in the first aspect of the present invention may be wholly organic but preferably is or comprises water (i.e. is aqueous).

In one case, the liquid medium comprises water and one or more water-miscible organic liquids.

Preferred water-miscible organic liquids for inclusion into the liquid medium are described in PCT patent application WO 2006/064193 at page 3, line 36 to page 4, line 8.

The liquid medium may comprise water and 1 or more, especially from 1 to 3, water-miscible organic liquids.

The weight ratio of water to water-miscible organic liquid when both are present in the liquid medium may be from 99:1 to 5:95, from 95:5 to 50:50, or from 95:5 to 70:30.

In one case the liquid medium present during cross-linking comprises water and less than 20%, more preferably less than 10% and especially less than 5% by weight of water-miscible organic liquids relative to all the components of the liquid medium. Most preferably the liquid medium present during the cross-linking consists only of water.

Dispersion

The dispersion provided in step i) of the first aspect of the present invention may be synthetically prepared as part of the claimed process alternatively it may be merely obtained e.g. from commercial sources.

Preferably, the dispersion comprises:
i) 0.1 to 40 parts, more preferably from 0.5 to 20 parts of polymer as defined in the first aspect of the present invention;
ii) 0.1 to 40 parts, more preferably from 1 to 20 parts of solid particles;
iii) 50 to 99.8 parts, more preferably from 60 to 98.5 parts of liquid medium wherein all parts are by weight.

Preferably, the sum of the parts i)+ii)+iii) is 100 parts.

Preferably, the amount of polymer expressed as a percentage of the amount of solid present in the dispersion is from 1 to 150%, more preferably from 5 to 100%, especially from 5 to 40% and most especially from 10 to 30%.

The dispersions are preferably prepared by comminuting a mixture comprising the polymer as defined in the first aspect of the present invention, the solid particles and the liquid medium.

Comminution as used herein means those dispersing processes which effectively reduce the particle size of the solid particles. Examples of suitable comminution processes include microfluidizing, ultrasonication, homogenisation and especially milling. Bead milling is especially preferred. Comminution does not include for example stirring, blending and rolling which do not tend to reduce the solid particle size to any appreciable extent.

Preferably, the average particle size of the pigment prior to comminution is greater than 1 micron.

Preferably, the average particle size of the solid particles after comminution is from 10 to 500 nm, especially from 30 to 300 nm and most preferably from 50 to 200 nm. The average particle size is preferably the Z or volume (Mv) average particle size. The average particle size may be measured by any suitable technique but laser light scattering is particularly preferred. Preferred apparatus for measuring the average particle size include the Zetasizer™ 3000 from Malvern and the Nanotrac 150 obtained from Honeywell Microtrac.

Preferably, the only dispersant present during the comminution step is the polymer as defined in the first aspect of the present invention. Preferably, this polymer at least partially adsorbs onto the pigment surface.

After comminution, it is possible to post add dispersants other than the polymer as defined in the first aspect of the present invention, but preferably this is not done by a further comminution process. Instead, such dispersants may be added by methods such as for example mixing, blending, stirring and the like.

The liquid medium during the comminution step may be as herein before described. That said, a particular advantage of the polymers according to the second aspect of the present invention is their ability to facilitate easy comminution without needing liquid media which contain large amounts of organic liquids.

Thus preferably, the liquid medium used for comminution comprises:
i) 80 to 100, more preferably from 90 to 100, especially from 95 to 100 and more especially from 99 to 100 parts of water; and
ii) 0 to 20, more preferably from 0 to 10, especially from 0 to 5 and more especially from 0 to 1 parts of one or more water-miscible organic liquids;
wherein the parts are by weight and the sum of the parts i) and ii) is 100.

Most preferably the liquid medium present during comminution comprises only water.

Cross-Linking

Preferably, the cross-linking step results in the formation of covalent bonds between polymer molecules.

When the polymer comprises ethylenically unsaturated groups the cross-linking step is preferably effected by adding an initiator, preferably a free radical initiator. Heat or light may be required to activate the initiator.

When the polymer comprises groups selected from —$NH_2$, —SH, —OH, —$CO_2H$, epoxy, a phosphorus containing acid and —NCO groups including salts thereof cross-linking is preferably effected by adding a cross-linking agent.

The cross-linking agent may be any suitable cross-linking agent known in the art.

Examples of suitable combinations of cross-linkable groups in the polymer and cross-linking groups in the cross-linking agent are listed in WO 2005/061087 at page 6, Table 1. Of these it is preferred that the cross-linkable group in the polymer is a —$CO_2H$ group and/or a phosphorus containing acid or salt thereof. For these cross-linkable groups the cross-linking agent is preferably selected from melamines, carbodiimides, oxetanes, isocyanates, aziridines and especially epoxides. Thus, in step ii) of the first aspect of the present invention the cross-linking reaction is preferably effected by the cross-linking reaction between:
a) —$CO_2H$ groups and/or a phosphorus containing acid groups in the polymer; and
b) a cross-linking agent.

More preferably the cross-linking is effected by a reaction between phosphorus containing acid groups in the polymer and a cross-linking agent (especially an epoxide). The phosphorus containing acid is preferably a phosphonic acid as hereinbefore mentioned.

When using epoxy cross-linking agents it is also advantageous to add boric acid and/or borate salts to better control the cross-linking reaction.

When a cross-linking agent is used to effect cross-linking the cross-linking reaction is preferably performed at a temperature of from 30 to 150° C., more preferably from 40 to 120° C. and especially from 50 to 100° C.

Catalysts may be added to speed the rate of cross-linking as required.

Drying or Concentration

The process according to first aspect of the present invention may additionally comprise the step of removing some or all of the liquid medium from the product. The liquid medium may be removed by methods such as evaporation and filtration. In this way the encapsulated pigment particles may be concentrated or converted into the form of a dry solid. Thus encapsulated solid particles are obtained or obtainable by the process according to the first aspect of the present invention and additionally the step of removing all of the liquid medium.

The dry solid may then be re-dispersed at a later time into a liquid medium. When the liquid medium comprises a mixture of water and a water-miscible organic liquid it may be desirable to selectively remove the water-miscible organic liquid. This may be performed by for example distillation or by membrane treatment.

Purification of the Dispersion

Preferably, the process according to the first aspect of the present invention further comprises the step of purifying the dispersion of encapsulated solid particles. Preferably, the purification process is performed after step ii) of the first aspect of the present invention. The purification can be by any suitable method including microfiltration, deionizer resins, centrifugation followed by decantation and washing. A preferred method is membrane filtration especially ultrafiltration.

Dispersions Obtainable by the Process

According to a third aspect of the present invention there is provided a dispersion of encapsulated solid particles obtained or obtainable by the process according to the first aspect of the present invention.

Preferably, these dispersions are used to prepare an ink, especially an ink jet printing ink. Thus, the inks comprise a dispersion according to the third aspect of the present invention.

Inks

Preferably, the ink comprises a dispersion according to the third aspect of the present invention, said ink comprising:
i) 0.1 to 30 parts, more preferably 0.1 to 15 parts of cross-linked polymer;
ii) 1 to 30 parts, more preferably 1 to 15 parts of pigment particles;
iii) 60 to 98.8 parts, more preferably 70 to 98.8 parts of a liquid medium wherein all parts are by weight and the cross-linked polymer encapsulates the pigment particles.

Preferably, the ink is an ink jet printing ink.

According to a fourth aspect of the present invention there is provided an ink jet printer ink comprising a dispersion according to the third aspect of the present invention, the ink having a composition comprising:
i) 0.1 to 15 parts of cross-linked polymer, where the polymer is as defined in the first aspect of the present invention or according to the second aspect of the present invention;
ii) 1 to 15 parts of pigment particles;
iii) 70 to 98.8 parts of liquid medium wherein all parts are by weight and the cross-linked polymer encapsulates the pigment particles.

Preferably, the sum of the parts i)+ii)+iii) is 100 parts.

Preferably, the ink has a viscosity of less than 50 mPa·s, more preferably less than 30 mPa·s and especially less than 15 mPa·s. The viscosity is preferably at least 2 mPa·s. Preferably, the viscosity is Newtonian. Preferably, the viscosity is measured at 25° C. Preferably, the viscosity is measured using a shear rate of 100 $s^{-1}$. The viscosity is preferably measured using a cone and plate geometry. A preferred apparatus for measuring the viscosity is a TA Instruments rheometer.

Preferably, the ink has a surface tension of 20 to 65 dynes/cm, more preferably 30 to 60 dynes/cm, when measured at a temperature of 25° C. The surface tension is preferably measured using a Kibron AquaPi.

The pH of the ink is preferably from 4 to 11, more preferably from 7 to 10.

When the ink is to be used as ink jet printing ink, the ink preferably has a concentration of halide ions of less than 500 parts per million, more preferably less than 100 parts per million. It is especially preferred that the ink has less than 100, more preferably less than 50 parts per million of divalent and trivalent metals. Parts per million as used above refers to parts by weight relative to the total weight of the ink. These low concentrations of ions in the resultant ink can be achieved by the abovementioned purification step.

Preferably, the process for making the ink includes a step for removing particles having a particle size of more than 1 micron in diameter, for example by filtration or centrifugation. Preferably the ink has less than 10%, more preferably less than 2% and especially less than 1% by weight of particles having a size of greater than 1 micron in diameter.

The liquid medium may be as herein before described. Again, the liquid medium is preferably aqueous.

Additives

Preferably, the ink further comprises one or more additives selected from viscosity modifiers, pH buffers, metal chelating agents, surfactants, corrosion inhibitors, biocides, dyes, water miscible organic solvent(s) and/or kogation reducing additives. Preferably, the process according to the first aspect of the present invention additionally comprises adding one or more of these additives after step ii) (the cross-linking step).

Cartridge

According to a fifth aspect of the present invention there is provided an ink jet printer cartridge, comprising a chamber and an ink according to the fourth aspect of the present invention wherein the ink is present in the chamber.

Ink Jet Printer

According to a sixth aspect of the present invention there is provided an ink jet printer comprising an ink jet printer cartridge according to the fifth aspect of the present invention.

Ink jet printer may be of any suitable kind. Preferred ink jet printers use thermal, piezo or acoustic heads to fire droplets of ink.

Substrates Printed with an Ink Jet Printer Ink

According to a seventh aspect of the present invention there is provided a substrate printed with an ink jet printing ink according to the fourth aspect of the present invention.

The substrate may be of any kind without limitation. Preferred substrates include paper, plastic and textile materials.

Preferred substrates are papers, e.g. plain or treated papers, which may have an acid, alkaline or neutral character. The paper may have an ink jet receptor layer. The receptor layer may be of the swellable or porous kind. Examples of commercially available papers are as described in International patent application No. WO 2007/148035, page 13, line 24 to the end of line 37, which are incorporated herein by reference thereto. Preferably, the substrate is a plain paper. Preferably, the substrate does not contain an ink fixative. Examples of ink fixatives which are preferably absent include cationic organic amines and cationic polymers.

Use

According to an eighth aspect of the present invention there is provided the use of a process according to the first aspect of the present invention for preparing an ink jet printing ink.

Examples

The present invention will now be illustrated by the following examples in which all parts are by weight unless stated to the contrary.

1.1 Preparation of Polymer Aqueous Solution (1)

Step i)

A suspension of cyanuric chloride (20 parts) in water (300 parts) and calsolene oil (3 drops) was stirred for 30 minutes at a temperature of from 0 to 5° C. in a reactor. The pH of the suspension was raised to 6.5 using saturated aqueous $K_2CO_3$.

Step ii)

A solution of aminomethylphosphonic acid (11.4 parts) in water (80 parts) was added portionwise to the reactor over 10 minutes. The reactor contents were stirred at a temperature of from 0 to 5° C. for a period of 4 hours whilst the pH was maintained in the range 6.5 to 7. The resulting mixture was filtered (Whatman GF/A) to remove any unwanted suspended solids.

Step iii)

A solution of hexamethylenediamine (11.6 parts) in water (40 parts) was added to the filtrate prepared above in step ii) at a temperature of from 0 to 5° C. The resulting mixture was stirred for 16 hours, during which it warmed up to 20° C. The pH of the mixture was raised to 9.5 using solid $K_2CO_3$ and the mixture was stirred and heated at 70° C. for 4 hours and then allowed to cool down to 20° C.

Step iv)

The resulting suspension formed in step iii) was dialysed to a conductivity of less than 100 microScm$^{-1}$ and the volume was reduced to give Polymer Aqueous Solution (1) with a solids content of about 7.5% by weight.

1.2 Preparation of Polymer Aqueous Solution (2)

Step i)

A suspension of cyanuric chloride (25 parts) in water (350 parts) and calsolene oil (6 drops) was stirred for 30 min at a temperature of from 0 to 5° C. in a reactor. The pH of the suspension was raised to 6.5 using saturated aqueous $K_2CO_3$.

Step ii)

A solution of glycine (9.4 parts) in water (60 parts) at pH 7 was cooled to 5° C. and added to the reactor. The reactor contents were stirred at a temperature of from 0 to 5° C. for a period of 4 hours whilst the pH was maintained in the range 6.5 to 7. The resulting mixture was filtered (Whatman GF/A) to remove any unwanted suspended solids.

Step iii)

A solution of hexamethylenediamine (14.5 parts) in water (30 parts) was added to the filtrate prepared above in step ii) at a temperature of from 0 to 5° C. The resulting mixture was stirred for 16 hours, during which it warmed up to 20° C. DABCO [aka 1,4-diazabicyclo[2.2.2]octane] (0.2 parts) was added and the pH of the mixture was raised to 9.5 using solid $K_2CO_3$. The mixture was stirred and heated at 70° C. for 4 hours and then allowed to cool down to 20° C.

Step iv)

The resulting suspension formed in step iii) was dialysed to a conductivity of less than 100 microScm$^{-1}$ and the volume was reduced to give Polymer Aqueous Solution (2) with a solids content of about 20% by weight.

1.3 Preparation of Comparative Polymer Aqueous Solution (1)

1.3.1 Preparation of Comparative Polymer (1)

A monomer feed composition was prepared by mixing benzyl methacrylate (785 parts), methacrylic acid (215 parts), butyl 3-mercaptopropionate (5.97 parts) and dipropylene glycol (375 parts).

An initiator feed composition was prepared by mixing tert-butyl peroxy-2-ethylhexanoate (17.60 parts) and dipropylene glycol (187.5 parts).

Dipropylene glycol (187.5 parts) was heated to 80° C. in a reactor vessel, continuously stirred and purged with a nitrogen gas atmosphere. The monomer feed and the initiator feed compositions were slowly fed into the reactor vessel whilst stirring the contents, maintaining the temperature at 80° C. and maintaining the nitrogen atmosphere. The monomer feed and the initiator feed were both fed into the reactor over 4 hours. The reactor vessel contents were maintained at 80° C. for a further 6 hours before cooling to 25° C. The final solids content was 40%. This was designated as Comparative Polymer (1).

Comparative Polymer (1) was an acrylic copolymer which had a number average molecular weight of 33,513, a weight average molecular weight of 76,764 and a polydispersity of 2.3 as measured by GPC. Comparative Polymer (1) had an acid value corresponding to 2.5 mmoles of acid groups/g of polymer. Comparative Polymer (1) contained the repeat units from benzyl methacrylate and methacrylic acid in the proportions 78.5:21.5 by weight respectively.

1.3.2 Comparative Polymer Aqueous Solution (1)

Comparative Polymer (1) as prepared in 1.3.1 (100 parts) was neutralised with potassium hydroxide aqueous solution to give an aqueous solution having a pH of about 9. This resulted in Comparative Polymer Aqueous Solution (1) which contained approximately 31% by weight of Comparative Polymer (1)

Mill-Base Preparation 2.1 Black Mill-Base (1)

Step i) Preparation of a Premixture

Pigment powder (60 parts of NIPex® 170IQ Carbon Black pigment, ex Evonik Degussa), Polymer Aqueous Solution (1) (80 parts) and water (260 parts) were mixed together to form a premixture.

Step ii) Comminution

The premixture prepared in 2.1, step i) was transferred to a vertical bead mill containing 0.8 mm ceramic beads and the mixture was milled for 1 hour.

The milling beads were then separated from the milled mixture. This resulted in Black Mill-base (1).

Step iii) Characterisation

The pigment particles in Black Mill-base (1) had an Mv particle size of 122 nm. The Mv particle size was established for all dispersions using a Nanotrac™ 150 obtained from Honeywell Microtrac. The proportion of polymer relative to pigment in Black Millbase (1) was about 10% by weight.

2.2 Black Mill-Base (2)

Step i) Preparation of a Premixture

Pigment powder (45 parts of NIPex® 170IQ Carbon Black pigment, ex Evonik Degussa), Polymer Aqueous Solution (1) (123 parts) and water (132 parts) were mixed together to form a premixture.

Step ii) Comminution

The premixture prepared in 2.2, step i) was transferred to a vertical bead mill containing 0.8 mm ceramic beads and the mixture was milled for 2.75 hours.

The milling beads were then separated from the milled mixture. This resulted in Black Mill-base (2).

Step iii) Characterisation

The pigment particles in Black Mill-base (2) had an Mv particle size of 122 nm. The proportion of polymer relative to pigment in Black Millbase (1) was about 20% by weight.

2.3 Black Mill-Base (3)

Step i) Preparation of a Premixture

Pigment powder (27 parts of NIPex® 170IQ Carbon Black pigment, ex Evonik Degussa), Polymer Aqueous Solution (1) (36 parts) and water (117 parts) were mixed together to form a premixture.

Step ii) Comminution Using Method B

The premixture prepared above in 2.3, step i) was then treated with ultrasound (Branson Digital Sonifier operating at 60% amplitude) at 5° C. for 10 minutes in 6 separate portions. The 6 portions were combined and this resulted in Black Mill-base (3).

Step iii) Characterisation

The pigment particles in Black Mill-base (3) had an Mv particle size of 101 nm. The proportion of polymer relative to pigment in Black Mill-base (3) is 10% by weight.

2.4 Black Mill-Base (4)

Black Mill-base (4) was prepared in the same way as Black Mill-base (3) described in section 2.3 above, except that Polymer Aqueous Solution (1) (36 parts) was replaced by Polymer Aqueous Solution 2 (25.2 parts), and the amount of water was increased to 127.8 parts.

The pigment particles in Black Millbase (4) had an Mv particle size of 104 nm. The proportion of polymer relative to pigment in Black Mill-base (4) is 20% by weight.

2.5 Comparative Black Mill-Base (1)

Step i) Preparation of a Premixture

Pigment powder (225 parts of NIPex® 170IQ Carbon Black pigment, ex Evonik Degussa), Comparative Polymer Aqueous Solution (1) (218 parts) and water (1057 parts) were mixed together to form a premixture. The premixture was thoroughly mixed together using a Silverson® mixer for 2 hours.

Step ii) Comminution

The premixture prepared in 2.5, step i) was transferred to a horizontal bead mill containing 0.38 mm beads and the mixture was milled for 9 hours.

The milling beads were then separated from the milled mixture. This resulted in Comparative Black Mill-base (1).

Step iii) Characterisation

The pigment particles in the resulting mill-base had a Z-Average average particle size of 117 nm. The Z-Average particle size was established using a Zetasizer® 3000 obtained from Malvern. The proportion of polymer relative to pigment in Comparative Black Millbase (1) was about 30% by weight.

3. Cross-Linking the Polymer to Prepare Encapsulated Pigment Dispersions 3.1 Cross-Linking of the Polymer (Dispersant)

The mill-bases prepared above in points 2.1-2.5 were adjusted to a solids content of about 5% to 10% by weight by the addition of water.

The polymers in each of the mill-bases were then cross-linked using a cross-linking agent, either polyglycerol polyglycidyl ether (Denacol® EX-521 obtained from Nagase ChemteX, with weight per epoxy=181, hereafter abbreviated as EX-521) or trimethylolpropane polyglycidyl ether (Denacol EX-321® obtained from Nagase ChemteX, with weight per epoxy=140, hereafter abbreviated as EX-321). This cross-linked the phosphonic and/or carboxylic acid groups in the polymer and thereby encapsulated the pigment. The cross-linking reaction was performed in the presence of boric acid (obtained from Aldrich). In each case a mixture was prepared containing the amounts of the components as specified in Table 1. The cross-linking reaction was effected by heating the above described mixture to a temperature of about 65° C. for 5 hours. This prepared a range of different Encapsulated pigment dispersions with the references as indicated in column 1 of Table 1.

TABLE 1

| Encapsulated Pigment Dispersion Reference | Mill-base used | Mill-base pigment content (%) | Mill-base (parts) | Cross-linker (parts) | Boric acid (parts) |
|---|---|---|---|---|---|
| Encapsulated Black Dispersion (1) | Black Mill-base (1) | 5 | 866 | EX-521 (2.79) | 0.80 |
| Encapsulated Black Dispersion (2) | Black Mill-base (2) | 5 | 366 | EX-521 (2.36) | 0.68 |
| Encapsulated Black Dispersion (3) | Black Mill-base (2) | 5 | 366 | EX-321 (1.54) | 0.68 |
| Encapsulated Black Dispersion (4) | Black Mill-base (3) | 10 | 50 | EX-521 (0.107) | 0.031 |
| Encapsulated Black Dispersion (5) | Black Mill-base (3) | 10 | 50 | EX-521 (0.215) | 0.062 |
| Encapsulated Black Dispersion (6) | Black Mill-base (3) | 10 | 50 | EX-521 (0.322) | 0.093 |
| Encapsulated Black Dispersion (7) | Black Mill-base (3) | 10 | 50 | EX-521 (0.429) | 0.124 |
| Encapsulated Black Dispersion (8) | Black Mill-base (4) | 10 | 50 | EX-521 (0.107) | 0.031 |
| Encapsulated Black Dispersion (9) | Black Mill-base (4) | 10 | 50 | EX-521 (0.215) | 0.062 |
| Encapsulated Black Dispersion (10) | Black Mill-base (4) | 10 | 50 | EX-521 (0.429) | 0.124 |
| Encapsulated Black Dispersion (11) | Black Mill-base (4) | 10 | 50 | EX-521 (0.644) | 0.185 |
| Comparative Encapsulated Black Dispersion (1) | Comparative Black Mill-base (1) | 10.4 | 1500 | EX-321 (6.54) | 2.89 |

4. Ultrafiltration

The Encapsulated black dispersions prepared above in 3.1 were purified by means of ultrafiltration using a membrane having a 50 kD pore size. The encapsulated black dispersions were diafiltered with approximately 5 to 10 wash volumes of pure deionized water per 1 volume of the Encapsulated black dispersion. The ultrafiltration membrane was then used to concentrate the encapsulated black dispersions back to a solids content of around 10 to 15% by weight.

5. Preparation of Inks and Comparative Inks

The black dispersions prepared in step 4. and Black Millbase (1) were used to prepare an Ink or Comparative black ink having the following composition.

Ink Vehicle

| Black Dispersion (solids) | X parts |
| --- | --- |
| 2-Pyrrolidone | 3.00 parts |
| Glycerol | 15.00 parts |
| 1,2 Hexane diol | 4.00 parts |
| Ethylene glycol | 5.00 parts |
| Surfynol ™ 465 | 0.50 parts |
| Pure water | sufficient to make 100 parts |

Surfynol$^R$ ™ 465 is a surfactant available from Air Products.

X Parts of Black Dispersion 6 parts of black pigment on an active or solids basis were used in all cases (e.g. approximately 60 parts of Encapsulated black dispersion when the solids content is 10% by weight).

Using the above ink composition, for example, Encapsulated Black Dispersion (1) was used to prepare Black Ink (1). The exact correspondence of references is outlined fully in Table 2.

TABLE 2

| Ink | Pigment Dispersion |
| --- | --- |
| Black Ink (1) | Encapsulated Black Dispersion (1) |
| Black Ink (2) | Encapsulated Black Dispersion (2) |
| Black Ink (3) | Encapsulated Black Dispersion (3) |
| Black Ink (4) | Encapsulated Black Dispersion (4) |
| Black Ink (5) | Encapsulated Black Dispersion (5) |
| Black Ink (6) | Encapsulated Black Dispersion (6) |
| Black Ink (7) | Encapsulated Black Dispersion (7) |
| Black Ink (8) | Encapsulated Black Dispersion (8) |
| Black Ink (9) | Encapsulated Black Dispersion (9) |
| Black Ink (10) | Encapsulated Black Dispersion (10) |
| Black Ink (11) | Encapsulated Black Dispersion (11) |
| Comparative Black Ink (1) | Black Mill-base (1) |
| Comparative Black Ink (2) | Comparative Encapsulated Black Dispersion (1) |

6. Preparation of Prints

Each of the Inks described above in point 5 were printed onto plain (untreated) paper, namely Xerox 4200 and Canon GF500 paper. Printing was performed by means of an Epson SX100 series ink jet printer printing 100% blocks of black.

7. Measurement of Reflectance Optical Density

For each print the Reflectance optical density (ROD) was measured using a Gretag Macbeth key wizard V2.5 Spectrolino photodensitometer instrument, illuminated using a D65 light source at an observer angle of 2° and with no filter fitted. Measurements were taken at at least two points along the print and were then averaged.

8. Results of Optical Density Measurements

The results of the ROD measurements are summarised below in Table 3.

TABLE 3

ROD of Prints obtained from Inks

| Ink | Polymer Aqueous Solution | Cross-linker | ROD on Xerox 4200 | ROD on Canon GF500 |
| --- | --- | --- | --- | --- |
| Black Ink (1) | (1) | EX-521 | 1.39 | 1.37 |
| Black Ink (2) | (1) | EX-521 | 1.37 | 1.35 |
| Black Ink (3) | (1) | EX-321 | 1.32 | 1.30 |
| Black Ink (4) | (1) | EX-521 | 1.34 | 1.34 |
| Black Ink (5) | (1) | EX-521 | 1.34 | 1.32 |
| Black Ink (6) | (1) | EX-521 | 1.31 | 1.31 |
| Black Ink (7) | (1) | EX-521 | 1.27 | 1.29 |
| Black Ink (8) | (2) | EX-521 | 1.26 | 1.28 |
| Black Ink (9) | (2) | EX-521 | 1.26 | 1.29 |
| Black Ink (10) | (2) | EX-521 | 1.26 | 1.26 |
| Black Ink (11) | (2) | EX-521 | 1.25 | 1.26 |
| Comparative Black Ink (1) | (1) | None | 1.38 | 1.40 |
| Comparative Black Ink (2) | Comparative Polymer Aqueous Solution (1) | EX-321 | 1.17 | 1.20 |

9. Evaluating the Stability of Encapsulated Pigment Dispersions and Mill-Bases

Black Ink (1) and Comparative Black Ink (1) described above were tested for stability by monitoring the change in particle size after heating at a temperature of 60° C. for 1 week. The smaller the change in particle size, the more stable the ink. The results of the stability tests were as shown in Table 4.

TABLE 4

Results of Ink Stability Evaluations

| Ink | Polymer Aqueous Solution | Cross-linker | Initial Particle Size (Mv) | Particle Size after 1 week at 60° C. (Mv) |
| --- | --- | --- | --- | --- |
| Black Ink (1) | (1) | EX-521 | 129 nm | 127 nm |
| Comparative Black Ink (1) | (1) | None | 134 nm | 374 nm |

The above tables show that Black Ink (1) containing Encapsulated Black Dispersion (1) had much greater stability than Comparative Black Ink (1) containing the uncrosslinked Black Mill-base (1), whilst maintaining the high Optical Density on printing. Meanwhile, the Black Inks prepared by the process of the present invention exhibited much higher optical densities on plain (untreated) papers than Comparative Black Ink (2), which contained Comparative Polymer (1). Comparative Polymer (1) was previously known in the art and is disclosed in PCT patent publication WO2010/038071. Thus, the present invention provides a process by which to prepare dispersions and inks having a superior property set when compared to the dispersions previously known.

10. Inks

The inks described in Tables I and II may be prepared wherein EBD [Encapsulated Black Dispersion] (1) is as mentioned above and the ink additives are as defined below. Numbers quoted in the second column onwards refer to the number of parts of the relevant ingredient and all parts are by weight. The inks may be applied to paper by thermal, piezo or Memjet ink jet printing.

The following abbreviations are used in Table I and II:
PG=propylene glycol
DEG=diethylene glycol
NMP=N-methylpyrrolidone DMK=dimethylketone
IPA=isopropanol
MeOH=methanol
2P=2-pyrrolidone
MIBK=methylisobutyl ketone
P12=propane-1,2-diol
BDL=butane-2,3-diol
Surf=Surfynol™ 465 from Air products
PHO=$Na_2HPO_4$ and
TBT=tertiary butanol
TDG=thiodiglycol
GLY=Glycerol
nBDPG=mono-n-butyl ether of dipropylene glycol
nBDEG=mono-n-butyl ether of diethylene glycol
nBTEG=mono-n-butyl ether of triethylene glycol

TABLE I

| EBD (1) Content | Water | PG | DEG | NMP | DMK | NaOH | Na Stearate | IPA | MEOH | 2P | MIBK | GLY | nBDPG |
|---|---|---|---|---|---|---|---|---|---|---|---|---|---|
| 30 | 50 | 5 | | 6 | 3 | | | | | 5 | | 1 | |
| 30 | 59.8 | | 5 | 5 | | 0.2 | | | | | | | |
| 40 | 45 | 3 | | 3 | 3 | | | 5 | 1 | | | | |
| 40 | 51 | | 8 | | | | | | | | 1 | | |
| 40 | 45.8 | 5 | | | | 0.2 | 4 | | | 5 | | | |
| 40 | 41 | | | 9 | | 0.5 | 0.5 | | | 9 | | | |
| 40 | 10 | 4 | 15 | 3 | 3 | | | 6 | 10 | 5 | 4 | | |
| 40 | 30 | | 20 | | | | | 9 | | | | | 1 |
| 50 | 25 | 5 | 4 | | 5 | | | | 6 | | 5 | | |
| 50 | 29.7 | 3 | 5 | 2 | 10 | 0.3 | | | | | | | |
| 50 | 15 | | 5 | 4 | 6 | | | 5 | 4 | 6 | 5 | | |
| 50 | 46 | | | | | | | | 4 | | | | |
| 40 | 50 | 5 | | | | | | 5 | | | | | |
| 40 | 40 | 2 | 6 | 2 | 5 | | | 1 | | 4 | | | |
| 40 | 40 | | 5 | | | | | | | 15 | | | |
| 40 | 44 | | | 11 | | | | | | 5 | | | |
| 50 | 30 | 2 | | 10 | | | | | 2 | | 6 | | |
| 50 | 39.7 | | | 7 | | 0.3 | | 3 | | | | | |
| 40 | 29 | 2 | 20 | 2 | 1 | | | | | 3 | 3 | | |
| 40 | 51 | | | 4 | | | | | | 5 | | | |
| 40 | 40 | | | | | | | | | | | 20 | |
| 40 | 40 | | | | | | | | | | | | 20 |

TABLE II

| EBD (1) content | Water | PG | DEG | NMP | Surf | TBT | TDG | BDL | PHO | 2P | PI2 | nBDEG | nBTEG |
|---|---|---|---|---|---|---|---|---|---|---|---|---|---|
| 30 | 49.8 | 15 | | | 0.2 | | | | | 5 | | | |
| 30 | 58.8 | | 5 | | | | | | 1.2 | 5 | | | |
| 40 | 44.6 | 5 | 5 | | 0.1 | 4 | 0.2 | | | | | | 1 |
| 40 | 5 | | 6 | 4 | 5 | | | | 0.12 | | | | |
| 40 | 49.8 | 4 | 8 | | | | | | | 6 | | | |
| 40 | 8 | | 10 | | 0.3 | | | 5 | 0.2 | | | | |
| 50 | 41.7 | | 5 | 5 | | | 0.3 | | | | | | |
| 50 | 44.8 | | 10 | 4 | | | | 1 | | 4 | 11 | | |
| 40 | 39.7 | 4 | 10 | 3 | | | | 2 | | 6 | | | |
| 40 | 20 | | | 6 | | | | | | 3 | | | |
| 40 | 35 | | 9 | 7 | | 2 | | | 0.95 | 5 | | 1 | |
| 40 | 51 | 5 | 11 | | | | | | | 6 | | | |
| 50 | 35.0 | | | 7 | | | | | | 7 | | | |
| 50 | 5 | 5 | 5 | 4.1 | | 0.2 | 0.1 | 5 | 0.1 | 5 | | | |
| 40 | 38 | | 10 | | 1 | | | | | | | | |
| 40 | 36 | | | | | | 10 | | | | | | |
| 30 | 24.5 | | | 5 | | | 12 | | | 5 | | | |
| 30 | 50 | 2 | | 8 | | | 15 | | | 5 | | | |
| 40 | 50 | | | | | | 8 | | | 12 | | | |
| 40 | 48 | 10 | | | | | | | | | | 10 | |
| 40 | 40 | | | | | | | | | 10 | | | 10 |

The invention claimed is:

1. A process for preparing a dispersion of encapsulated solid particles in a liquid medium comprising:
   i) providing a dispersion comprising solid particles, a liquid medium and a polymer comprising at least one repeat unit of the Formula (1) or a salt thereof:

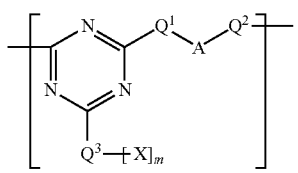

Formula (1)

wherein:
   each X independently is an alkyl, aryl, or heterocyclyl group each of which may be optionally substituted;
   $Q^1$ and $Q^2$ independently is $NR^1$, O or S; wherein $R^1$ independently is H or an optionally substituted alkyl, aryl or heterocyclyl group;
   A is an optionally substituted divalent organic linking group;
   m independently is 1 or 2; and when m is 1, $Q^3$ independently is $NR^1$, O or S and
   $R^1$ is H or an optionally substituted alkyl, aryl or heterocyclyl group; or when m is 2,
   $Q^3$ is N; and
   ii) cross-linking the polymer in the presence of the solid particles and the liquid medium so as to encapsulate the solid particles.

2. A process according to claim 1 wherein prior to cross-linking the polymer has groups selected from —$NH_2$, —SH, —OH, —$CO_2H$, epoxy, phosphorus containing acid and —NCO groups including salts thereof.

3. A process according to claim 2 wherein prior to cross-linking the polymer has —$CO_2H$ groups and/or phosphorus containing acids groups or salts thereof.

4. A process according to claim 2 wherein the groups selected from —$NH_2$, —SH, OH, —$CO_2H$, epoxy, phosphorus containing acid and —NCO including salts thereof are each independently attached to an X group in the polymer.

5. A process according to claim 1 wherein prior to cross-linking the polymer comprises at least two kinds of repeat units of Formula (1) or a salt thereof:
   i) a first repeat unit which has one or more phosphorus containing acid groups; and
   ii) a second repeat unit which has one or more carboxylic acid groups.

6. A process according to claim 1 wherein prior to cross-linking the polymer has phosphorus containing acid groups which are cross-linked in step ii) with a cross-linking agent so as to encapsulate the solid particles.

7. A process according to claim 1 wherein each A group present in the polymer is independently selected from $C_{2-30}$ alkylene, a phenylene, a naphthylene and a xylylene group each of which may be optionally substituted.

8. A process according to claim 1 wherein each A group present in the polymer is selected from $(CH_2)_4$, $(CH_2)_6$ or p-xylylene.

9. A process according to claim 1 wherein all the groups represented by $Q^1$ and $Q^2$ which are present in the polymer are $NR^1$.

10. A process according to claim 1 wherein the polymer comprises only repeat units of Formula (1) or a salt thereof and terminal groups.

11. A process according to claim 1 wherein the polymer has a chain comprising from 2 to 1000 repeat units of Formula (1) or salts thereof.

12. A process for preparing encapsulated solid particles comprising the process according to claim 1 and additionally the step of removing all of the liquid medium.

13. A process according to claim 1 wherein the solid is a pigment.

14. A dispersion of encapsulated solid particles obtained by the process according to claim 1.

15. A dispersion of encapsulated solid particles according to claim 14 wherein the solid is a pigment.

16. An ink jet printer ink comprising a dispersion according to claim 15, the ink having a composition comprising:
   i) 0.1 to 15 parts of the cross-linked polymer;
   ii) 1 to 15 parts of pigment particles;
   iii) 70 to 98.8 parts of liquid medium
wherein all parts are by weight and the cross-linked polymer encapsulates the pigment particles.

17. An ink jet printer cartridge, comprising a chamber and an ink according to claim 16 wherein the ink is present in the chamber.

18. An ink jet printer comprising an ink jet printer cartridge according to claim 17.

19. A substrate printed with an ink jet printing ink according to claim 16.

20. A process for preparing an ink jet printing ink comprising a process according to claim 13.

* * * * *